United States Patent [19]

Lewis, Jr.

[11] Patent Number: 4,506,288
[45] Date of Patent: Mar. 19, 1985

[54] CCD DELAY LINE SYSTEM FOR TRANSLATING AN ANALOG SIGNAL

[75] Inventor: Henry G. Lewis, Jr., Hamilton Square, N.J.

[73] Assignee: RCA Corporation, New York, N.Y.

[21] Appl. No.: 439,561

[22] Filed: Nov. 5, 1982

[51] Int. Cl.³ ............................................. H04N 9/535
[52] U.S. Cl. .................................................. 358/21 R
[58] Field of Search ............. 358/21 R; 307/590, 596, 307/605, 607; 333/165, 166

[56] References Cited

U.S. PATENT DOCUMENTS 3,474,260 10/1969 Frohbach .
3,737,683 6/1973 Sangster .
3,939,364 2/1976 Adam et al. .
3,999,171 12/1976 Parsons .
4,096,516 6/1978 Pritchard .
4,134,029 1/1979 Bright et al. .

Primary Examiner—Richard Murray
Attorney, Agent, or Firm—Joseph S. Tripoli; George E. Haas; George J. Seligsohn

[57] ABSTRACT

The use of a return-to-zero (RZ) sample and hold circuit between the CCD delay line circuit and the low-pass filter of the analog signal translation system provides a steeper high-frequency roll-off of the output from the low-pass filter than does a non-return-to-zero (NRZ) sample and hold circuit, and, therefore, produces less attenuation of high-frequency components of analog signal, such as the color-carrier of an NTSC color television signal.

4 Claims, 5 Drawing Figures

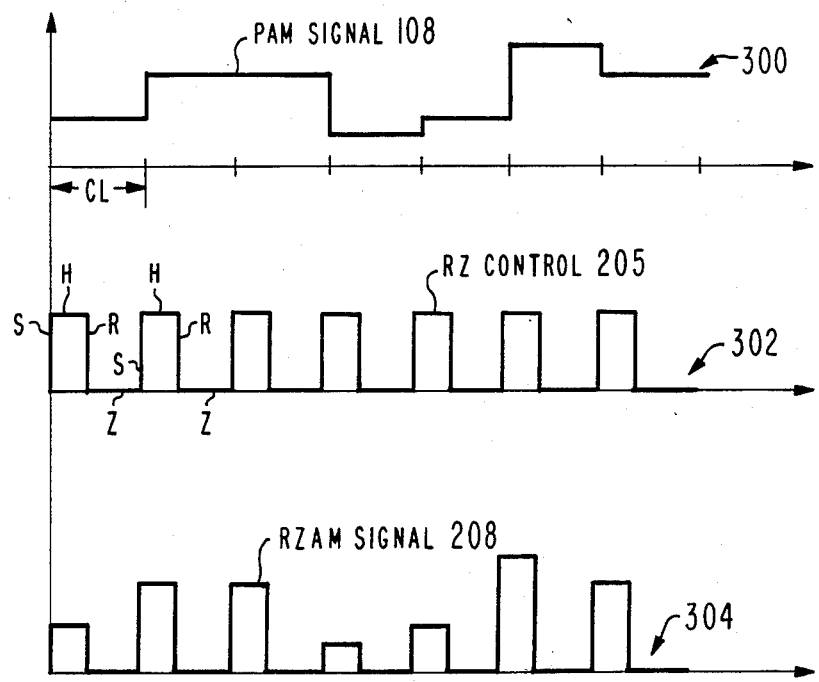
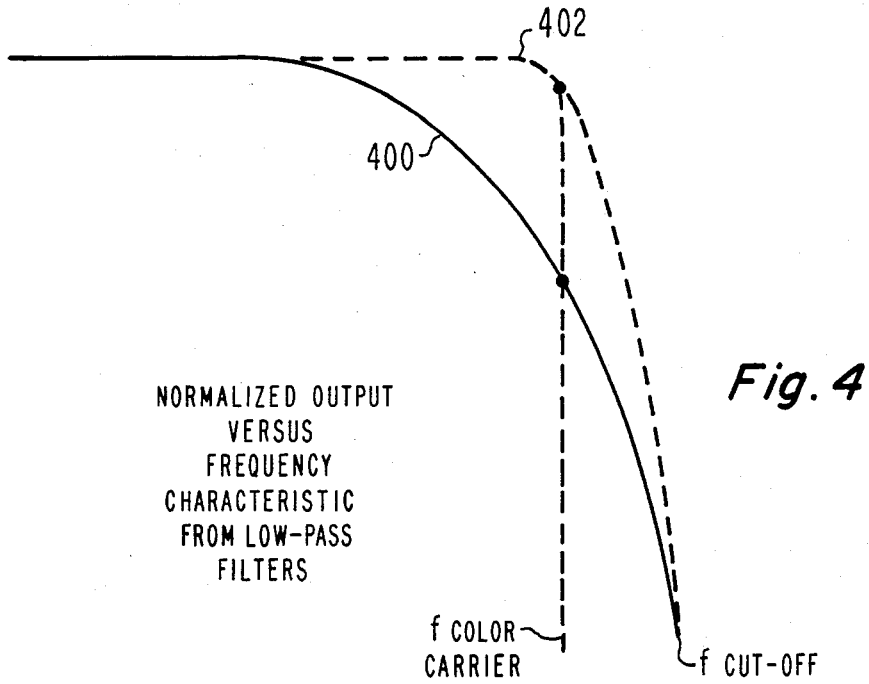

CCD DELAY LINE SYSTEM FOR TRANSLATING AN ANALOG SIGNAL

This invention relates to an improvement in analog signal translation systems of a type which employ charge coupled device (CCD) delay line circuits.

As is known in the art, a CCD delay line can be used alone to translate an analog signal along its length from its input to its output. Alternatively, a CCD delay line may be incorporated in more complex CCD delay line circuits, such as a CCD transversal filter, responsive to an applied input analog signal. Such CCD delay line circuits, whether simple or complex, employ clock signals occurring at a given clock frequency for sampling the input signal applied thereto (which, for the purposes of the present invention, is an input analog signal). Further, the sampled analog signal is transferred at the given clock frequency through the CCD delay line to the output of the CCD delay line circuit. Therefore, at the output of the CCD delay line circuit output analog signal samples appear which occur at the given clock frequency. In order to derive an output analog signal from which the given clock frequency has been removed, the output analog signal samples are passed through output means which include a low-pass filter having a cut-off frequency below the given clock frequency.

In the past, the output analog signal samples from the CCD delay line circuit were forwarded to the input of the low-pass filter in the form of a pulse-amplitude-modulated (PAM) signal. This causes the output signal from the low-pass filter (which is proportional to the product of the input signal multiplied by the transfer function of the low-pass filter) to have a sin x/x relatively gentle amplitude roll-off at the high-frequency end of the output signal from the low-pass filter. In sampling theory parlance, this amplitude roll-off is often referred to as aperture error. This aperture error may be compensated for with a relatively expensive x/sin x equalizer or a simple relatively inexpensive resistance-capacitance (RC) peaking circuit. However, use of an RC peaking circuit tends to produce phase distortion of the signal. In certain cases, phase distortion of the signal is particularly undesirable. One such case is phase distortion of the phase-modulated color carrier component of an NTSC color television signal.

Reference is made to U.S. Pat. No. 4,096,516, which issued to Pritchard on June 20, 1978. This patent discloses a CCD transversal filter delay line circuit, operating as a comb filter, for processing an NTSC color television signal. Pritchard discloses only one stage of CCD delay line transversal filtering. However, there can be cases in which it is desirable to pass an NTSC color television signal through two or more CCD delay line circuits. There is a limit to the amount of RC peaking that may be added to a system and still maintain reasonable signal fidelity.

The present invention is directed to an analog signal translation system employing a CCD delay line circuit in which the roll-off aperture error at the low-pass filter output is substantially reduced, so that the need for RC peaking is either eliminated or, at the very least, significantly reduced. More specifically, in accordance with the principles of the present invention, a return-to-zero (RZ) sample and hold circuit is coupled between the output of the CCD delay line circuit and the input to the low-pass filter. The sample and hold circuit is controlled by a control signal occurring at the same clock frequency as the clock signals applied to the CCD delay line circuit to effect the sensing, at this clock frequency, of the level of each output analog signal sample of the CCD delay line circuit. Further, in accordance with the control signal applied thereto, the RZ sample and hold circuit maintains the input to the low-pass filter at a level substantially proportional to the sensed level for only a predetermined time interval following each sensing, which predetermined time interval is less than a clock signal period. At the end of this predetermined time interval, the input to the low-pass filter returns to a zero level for the remainder of that clock signal period.

IN THE DRAWINGS

Figure 1:
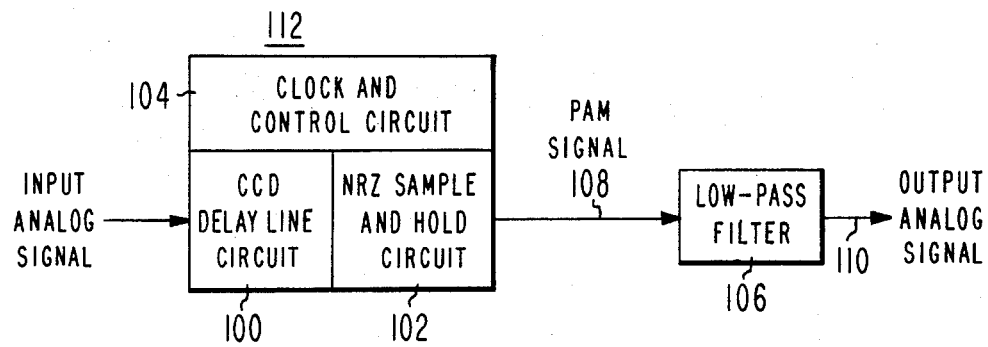
FIG. 1 is a block diagram schematically illustrating a prior-art analog signal translation system employing a CCD delay line circuit.
Figure 2:
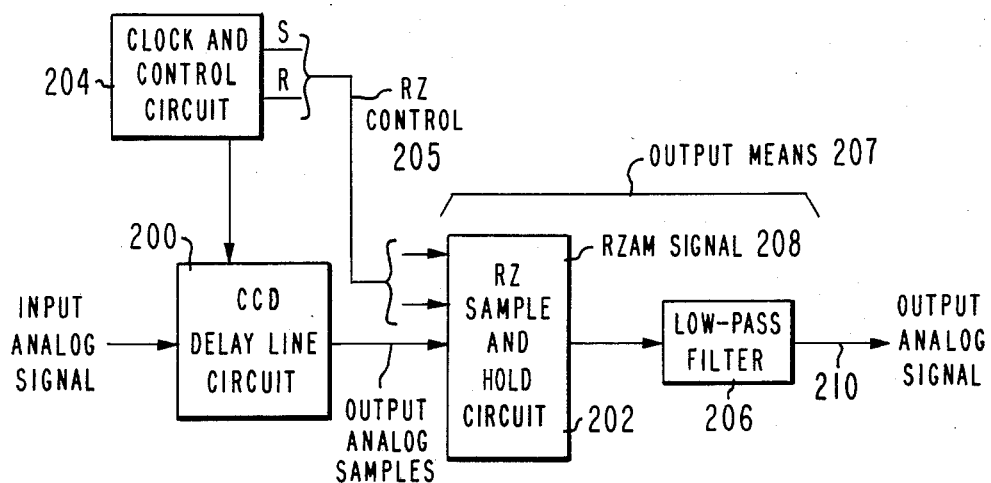
FIG. 2 is a block diagram schematically illustrating an analog signal translation system embodying the present invention.

FIG. 3 consists of timing diagrams helpful in explaining the operation of the respective analog signal translation systems shown in FIGS. 1 and 2; and FIG. 4 shows plots of the normalized output vs. the frequency characteristic of each of the respective low-pass filters of the analog signal translation systems shown in FIGS. 1 and 2.

Referring to FIG. 1 there is schematically shown a prior-art type of analog signal translation system employing a CCD delay line circuit. Such a prior-art system includes the CCD delay line circuit 100 itself, which has an input analog signal applied to the input thereof; a non-return-to-zero (NRZ) sample and hold circuit 102 coupled to the output of CCD delay line circuit 100; clock and control circuit 104 for applying clock signals and control signals to circuits 100 and 102 at a given clock frequency; and low-pass filter 106, which has a pulse-amplitude-modulation (PAM) signal 108 appearing at the output of sample and hold circuit 102 applied to the input thereof. An output analog signal 110 appears at the output of low-pass filter 106. Usually, circuits 100, 102 and 104 are included on a single monolithic integrated circuit chip 112. However, low-pass filter 106 is usually comprised of elements located external to chip 112. In some cases, though, an amplifier, forming part of or in cascade with the sample and hold circuit, itself, exhibits low-pass filter characteristics. Therefore, both in FIG. 1 (and FIG. 2) the sample and hold circuits and low-pass filter can take various physical forms, so long as they perform the functions described below.

Figure 1A:
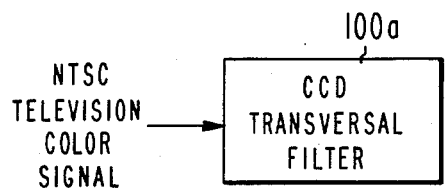
FIG. 1a illustrates a specific embodiment of the CCD delay line circuit of FIG. 1 and a specific example of the form of the applied input analog signal shown in FIG. 1.

In its simplest form, CCD delay line circuit 100 can consist solely of an N-stage CCD delay line (where N is a plural integer). In this case, NRZ sample and hold circuit 102 can be merely an additional (N+1) stage following the Nth stage of CCD delay line circuit 100. Alternatively, CCD delay line circuit 100 can be comprised of a more complex circuit incorporating a CCD delay line, such as a CCD transversal filter 100a, shown in FIG. 1a. An example of such a CCD transversal filter is the CCD transversal filter operating as a comb-filter disclosed in the aforesaid Pritchard U.S. Pat. No. 4,096,516, which is employed to process an NTSC television color input analog signal. As indicated in FIG. 1a, an NTSC television color signal is applied as the input analog signal to CCD transveral filter 100a. However, it should be understood that the input analog signal applied to CCD delay line circuit 100 or CCD transversal filter 100a is not limited to an NTSC television color signal, but can represent any desired information.

Clock and control circuit 104 generates a required number of different clock and control signals needed for CCD delay line circuit 100 and NRZ sample and hold circuit 102. All the clock and control signals normally have the same given clock frequency. However, the relative phase of the different clock and control signals is normally different from one another. In any case, assuming CCD delay line circuit 100 to be operated by a predetermined plural number of clock signals of different phases (as is conventional in the CCD art), the input analog signal applied to the input of circuit 100 is sampled at the clock frequency of the clock signals. Then the sampled analog signal is transferred at this given clock frequency along the CCD delay line of circuit 100. Regardless of whether output from CCD delay line circuit 100 is derived from solely the Nth stage of the CCD delay line or whether the delay line is tapped at a plurality of stages thereof and the output from circuit 100 is derived through coupling means that apply the input analog signal to the input of the delay line and then combine the respective signals appearing at the various taps (as is the case in a transversal filter), the output from circuit 100 is comprised of analog signal samples occurring at the given clock frequency.

Under the control of control signals occurring at the given clock frequency, sample and hold circuit 102 senses the level of each successive analog signal sample and holds this level for an entire clock period (i.e., until the sensing of the next successive analog signal sample). Functionally, sample and hold circuit 102 operates as a non-return-to-zero (NRZ) sample and hold circuit that produces PAM signal 108 at its output.

A typical example of PAM signal 108 is shown in timing diagram 300 in FIG. 3. As indicated in timing diagram 300, PAM signal 108 is in the form of a histogram (in which changes in level can only occur at integral multiples of the clock period CL), rather than in the form of a continuous analog signal. As is known in sampling theory, (i.e., Nyquist theorem) a sampling frequency no smaller than twice the highest information-bearing frequency component of the analog signal is required to avoid losing information. Therefore, the given clock frequency of clock and control circuit 104 is selected to be at least twice as high as the highest information-bearing frequency component of the input analog signal applied to CCD delay line circuit 100. In order to convert PAM signal 108 into a continuously-varying output analog signal, it is necessary to pass PAM signal 108 through a low-pass filter which passes all the information-bearing frequency components contained in the input analog signal, but which removes the substantially higher non-information bearing clock frequency. It is for this reason that PAM 108 is passed through low-pass filter 106 to derive output analog signal 110.

Plot 400 (shown in solid line) of FIG. 4 qualitatively illustrates the normalized output vs. frequency characteristic from low-pass filter 106. If the attenuation at a particular cut-off frequency $f_{cut-off}$ is selected to have some certain desired value (e.g., 20 dB, 30 dB, etc.), then the rate of normalized output roll-off at the upper end of the pass band of the output signal from the low-pass filter is relatively gentle. In more quantitative terms, the roll-off of the normalized output (i.e., the product of PAM signal and the transfer function of low-pass filter 106) varies as a sin x/x function. Therefore, the attenuation undergone by a relatively high frequency component of the analog signal, such as the 3.58 MHz color carrier, $f_{color\ carrier}$, component of an NTSC television color signal, is quite large. One known way of compensating for this is to employ an RC peaking circuit after the low-pass filter. However, this can cause phase distortion of the color-manifesting phase modulation of the NTSC color carrier. The use of an x/sin x equalizer, instead of a RC peaking circuit, compensates for the roll-off without producing any appreciable phase distortion. However, an x/sin x equalizer is much more expensive than a simple RC peaking circuit.

The present invention, by employing a return-to-zero (RZ) sample and hold circuit, rather than an NRZ sample and hold circuit, significantly reduces the problem of gentle roll-off of the normalized output at the higher frequency end of the pass band of the low-pass filter. More specifically, referring to FIG. 2, CCD delay line circuit 200 corresponds in structure and function to CCD delay line circuit 100. Thus, clock and control circuit 204 applies clock signals at a given clock frequency to delay line circuit 200 in a manner substantially identical to the manner in which clock and control circuit 104 applies clock signals to delay line circuit 100. However, in the case of FIG. 2, the output analog samples appearing at the output of delay line circuit 200 are applied as a signal input to RZ sample and hold circuit 202 rather than an NRZ sample and hold circuit 102. Further, in the case of FIG. 2, clock and control circuit 204 applies an RZ control signal 205 as a control input to RZ sample and hold circuit 202.

RZ control signal 205 may take any one of several different forms. For instance, RZ control signal 205 may comprise a series of pulses occurring at the given clock frequency with each pulse having a certain pulse width which is less than the clock-signal period. In this case, RZ sample and hold circuit 202 senses the level of each output analog sample at the leading edge of each RZ control signal pulse; maintains the sensed level for a predetermined time interval thereafter, which is less than a clock signal period, and at the end of this predetermined time interval returns to a zero level for the remainder of that clock signal period. Alternatively, RZ control signal 205 may be comprised of a series of sensing and a series of return-to-zero pulses, both of which occur at the given clock frequency, but have a relative phase delay therebetween equal to the predetermined time interval between the sensing level of an analog signal sample and the return to the zero level. Another alternative is to provide an RZ control signal 205 comprised of a first portion comprising a series of short sensing pulses S (shown in FIG. 2) occurring at the given clock frequency together with a second portion comprising a separate adjustable dc level R (shown in FIG. 2). In this latter case, sample and hold circuit 202 includes an adjustable delay circuit that provides a delay following each first portion sensing pulse which is determined by the magnitude of the second portion dc level of RZ control signal 205. In this manner, the length of the predetermined time interval may be adjusted by varying the level of the second dc portion.

Timing diagram 302 of RZ control signal 205, shown in FIG. 3, is drawn to the same clock-frequency period CL as is timing diagram 300 of PAM signal 108. In timing diagram 302, each clock-frequency period CL is divided into a hold time interval, and a zero-level time interval Z. The hold time interval H extends from the time S occurring at the beginning of each period CL to a time R occurring before the end of that period CL. The Z time interval occurs between time R and the end of a period CL.

Returning to FIG. 2, RZ sample and hold circuit 202 provides a return-to-zero amplitude-modulated (RZAM) signal 208, which is supplied as an input to low-pass filter 206. In response thereto, low-pass filter 206 produces an output analog signal 210.

Returning to FIG. 3, there is shown timing diagram 304 of RZAM signal 208. As indicated in timing diagram 304, RZAM signal 208 assumes a level during the H time interval of each period CL which is substantially proportional to the sensed level of the output analog sample from CCD delay line circuit 200 for that period CL. During the time interval Z of each period CL, RZAM signal 208 has a zero level.

By comparing the RZAM signal 208 shown in timing diagram 304 with the PAM signal 108 shown in timing diagram 300, it is plain that the average signal energy of PAM signal 108 is greater than that of RZAM signal 208. In fact, the shorter the time interval H is, the larger will be the difference between the average energy of output analog signal 110 and output analog signal 210. However, what is more important, for the purposes of the present invention, is that the roll-off of output analog signal 210 is steeper than is the roll-off of output analog signal 110. Further, the shorter the time interval H is, the greater this difference in steepness becomes. In this regard, reference is made to plot 402 (shown in dashed line) of the normalized output vs. frequency characteristic from low-pass filter 206, shown in FIG. 4. As indicated in FIG. 4, if low-pass filter 206 is designed to provide the same cut-off frequency $f_{cut-off}$ for output analog signal 210 as that provided by low-pass filter 106 for output analog signal 110, the relative attenuation for a high-frequency component of the output pass band from low-pass filter 206 (such as the 3.58 MHz color-carrier, $f_{color\ carrier}$, of an NTSC television color signal), is substantially smaller for output analog signal 210 (shown in plot 402) than it is for output analog signal 110 (shown in plot 400). Therefore, the present invention makes it possible to inexpensively do away with the need for RC peaking circuits for compensating for the roll-off attenuation in the output analog signal.

In order to achieve the best trade-off between the steepness of the roll-off characteristics and the energy content of the output analog signal 210, it is desirable to make the length of the time interval H adjustable. Some integrated RZ sample and hold circuit chips include a pin for applying an RZ pulse width control from an external source (such as from clock and control circuit 204). This external control from clock and control circuit 204 can comprise the adjustable-level dc second portion R of RZ control 205, discussed above.

What is claimed is:

1. In an analog signal translation system comprising (1) a charge coupled device (CCD) delay line circuit having an input, an output and coupling means including a CCD delay line coupling said input to said output, (2) a clock and control circuit applying clock signals at a given clock frequency to said CCD delay line circuit for sampling an input analog signal applied to said input of said CCD delay line circuit at said given clock frequency and for transferring said sampled analog signal at said given clock frequency along said CCD delay line of said coupling means to said output of said CCD delay line circuit, whereby output analog signal samples occurring at said given clock frequency are derived at said output of said CCD delay line circuit, and (3) output means including a low-pass filter having a cut-off frequency below said given clock frequency, said output means being coupled to said output of said CCD delay line circuit and being responsive to said output analog signal samples for deriving, at an output of said low-pass filter, an output analog signal from which said given clock frequency has been removed; the improvement wherein:

said output means includes a return-to-zero (RZ) sample and hold circuit coupled between said output of said CCD delay line circuit and an input to said low-pass filter, said sample and hold circuit being controlled by a control signal from said clock and control circuit for sensing at said given clock frequency the level of each output analog signal sample and then maintaining said input to said low-pass filter at a level substantially proportional to said sensed level only for a predetermined time interval following each sensing, which predetermined time interval is less than a clock signal period, so that at the end of said predetermined time interval said input to said low-pass filter returns to a zero level for the remainder of that clock signal period.

2. The analog signal translation system defined in claim 1, wherein said control signal from said clock and control circuit is capable of adjusting the length of said predetermined time interval.

3. The analog signal translation system defined in claim 1, wherein said CCD delay line circuit comprises a transversal filter, said transversal filter incorporating said CCD delay line, said output from said tranversal filter constituting said output from said CCD delay line circuit.

4. The analog signal translation system defined in claim 3, wherein said input analog signal is an NTSC color television signal that includes a relatively high frequency color carrier component, wherein the cut-off frequency of said low-pass filter is selected to exhibit relatively little attenuation to all frequency components of an NTSC color television signal and to exhibit relatively large attenuation to frequencies beyond the highest frequency component of said NTSC color television signal.

* * * * *